(12) United States Patent
Osuga

(10) Patent No.: US 8,589,477 B2
(45) Date of Patent: Nov. 19, 2013

(54) CONTENT INFORMATION DISPLAY DEVICE, SYSTEM, AND METHOD USED FOR CREATING CONTENT LIST INFORMATION BASED ON A STORAGE STATE OF CONTENTS IN A CACHE

(75) Inventor: Toru Osuga, Tokyo (JP)

(73) Assignee: NEC Corporation, Tokyo (JP)

( * ) Notice: Subject to any disclaimer, the term of this patent is extended or adjusted under 35 U.S.C. 154(b) by 177 days.

(21) Appl. No.: 12/920,197

(22) PCT Filed: Feb. 18, 2009

(86) PCT No.: PCT/JP2009/052808
§ 371 (c)(1),
(2), (4) Date: Aug. 30, 2010

(87) PCT Pub. No.: WO2009/113371
PCT Pub. Date: Sep. 17, 2009

(65) Prior Publication Data
US 2011/0035441 A1 Feb. 10, 2011

(30) Foreign Application Priority Data
Mar. 12, 2008 (JP) ................................. 2008-061950

(51) Int. Cl.
*G06F 15/16* (2006.01)
*G06F 15/173* (2006.01)

(52) U.S. Cl.
USPC ............................ 709/203; 709/223; 709/225

(58) Field of Classification Search
USPC .................. 709/203, 223, 225; 725/9, 14, 87; 707/999.01, E17.001, 705; 711/118, 711/144, 113, 120, 129, 133, 134; 345/1.1
See application file for complete search history.

(56) References Cited

U.S. PATENT DOCUMENTS

| 2002/0114342 | A1* | 8/2002 | Yao | 370/429 |
| 2004/0064832 | A1* | 4/2004 | Tsukidate et al. | 725/14 |
| 2005/0114510 | A1* | 5/2005 | Error et al. | 709/225 |
| 2006/0220982 | A1* | 10/2006 | Ueda | 345/1.1 |

FOREIGN PATENT DOCUMENTS

| JP | 2002351772 A | 12/2002 |
| JP | 2003030034 A | 1/2003 |
| JP | 2005012282 A | 1/2005 |
| JP | 2005086323 A | 3/2005 |
| JP | 2006115477 A | 4/2006 |
| JP | 2006221212 A | 8/2006 |

OTHER PUBLICATIONS

International Search Report for PCT/JP2009/052808 mailed May 26, 2009.

* cited by examiner

*Primary Examiner* — Quang N Nguyen
*Assistant Examiner* — Raji Krishnan

(57) ABSTRACT

A content information display device includes a content list display unit that creates content list information to be presented to a user by a user terminal based on content information stored in a content delivery server. The content display unit creates the content list information based on the storage state of contents in a cache for delivering a content to the user terminal.

7 Claims, 5 Drawing Sheets

CONTENT INFORMATION DISPLAY DEVICE, SYSTEM, AND METHOD USED FOR CREATING CONTENT LIST INFORMATION BASED ON A STORAGE STATE OF CONTENTS IN A CACHE

TECHNICAL FIELD

The present invention relates to a content information display device, a content information display system, and a content information display method used for the same and, particularly, to a delivery system that delivers a content to a user terminal through a cache such as a proxy server or an edge server.

BACKGROUND ART

As a computer achieves higher performance and a network covers a higher bandwidth, a VoD (Video on Demand) service that allows a user to acquire and view a high-quality video content at any time wishing to view it is increasingly widespread.

As a delivery system related to the present invention, there is fast streaming that acquires a buffer size up to the start of playback in a burst fashion in a streaming delivery for the purpose of improving the user's quality of experience in such a service (cf. e.g. Patent Document 1).

Further, as a delivery system related to the present invention, there is a technique such as progressive download that downloads a video content using a protocol for bulk data transfer such as HTTP (Hyper Text Transfer Protocol)/TCP (Transmission Control Protocol) and plays back the content in parallel. By such techniques, a delivery system related to the present invention enables reduction of a waiting time until the start of viewing as well as allocating a buffer size that avoids breakdown of viewing.

However, in a best-effort network such as the Internet, due to a significant decrease in throughput, an increase in delay time or the like caused by congestion on a communication path, an enormous waiting time until the start of viewing or breakdown of viewing occurs even with use of such techniques, and there is a possibility that significantly degrades the user's quality of experience.

On the other hand, as a delivery system related to the present invention, a content cache method as described in Patent Document 2, for example, is used to reduce a waiting time until the start of viewing as well as avoiding breakdown of viewing.

In the content cache method described in Patent Document 2, an edge server that caches contents is placed between a user terminal and a central delivery server. When a request is made for a content cached in the edge server, the content is delivered from the edge server, so that a communication distance to the user terminal is shortened to reduce the effect of congestion such as a decrease in throughput.

The mechanism of the content cache method is described hereinafter in detail. The content cache method calculates a parameter indicating the degree of fitness for each of contents registered in the VoD service on the basis of user's preference information, viewing records, service contract details and promotion contract details with a content provider.

Then, the content cache method pre-caches contents into the edge server based on the calculated degree of fitness. When a new content is registered, the method calculates the degree of fitness for the new content, compares it with the degree of fitness of the content cached in the edge server, and replaces the cache.

Because the degree of fitness is a parameter that reflects user's preference or content promotion status for its calculation method, by selecting contents to be pre-cached into the edge server based thereon, it is possible to increase a probability of delivering a content requested by a user from the cache (cache hit ratio). The content cache method can thereby probabilistically reduce a communication distance to a user and reduce the effect of congestion such as a decrease in throughput.

[Patent Document 1]
Japanese Unexamined Patent Application Publication No. 2006-115477
[Patent Document 2]
Japanese Unexamined Patent Application Publication No. 2005-12282

DISCLOSURE OF INVENTION

Technical Problem

In the content delivery system related to the present invention, by the content cache method, contents to be cached are selected on the basis of user's preference, content promotion status or the like. The content cache method thereby increases the cache hit ratio, reduces the effect of congestion such as a decrease in throughput and improves the user's quality of experience.

However, in a display method of contents to a user using a content list such as a program guide like EPG (Electronic Program Guide) or ECG (Electronic Content Guide) or a search result, a selection of a content to be presented to a user is made separately from the content cache method, and display of a content based on the storage state of caches is not performed.

Therefore, according to the content display method, there is a possibility of preferentially presenting a content that is not cached in the edge server to a user, which leads to a problem that the cache hit ratio decreases and the effect of congestion such as a decrease in throughput increases to cause degradation of the user's quality of experience.

In the technique disclosed in Patent Document 2, it is likely that a content to be presented is selected by using similar information, such as selecting a content to be presented to a user on the basis of user's preference information, viewing records, information of the type of a desired content to be displayed set by a user or the like. However, because the storage state of caches is not directly reflected in the technique disclosed in Patent Document 2, a difference occurs between a presented content and the storage state of caches, which can cause the above problem.

In light of the foregoing, an object of the present invention is to overcome the above problem and provide a content information display device, a content information display system, a content information display method used for the same, and a program in which the cache hit ratio increases, the effect of congestion such as a decrease in throughput is reduced, and the user's quality of experience is improved.

Technical Solution

A content information display device according to the present invention is a content information display device used in a system wherein content list information is created based on information of contents stored in a content delivery server and transmitted to a user terminal, and the user terminal presents the content list information to a user, which includes:

content list display means for creating the content list information by adding a content storage state in a cache for delivering a content to the user terminal to the information used for creation of the content list information.

A content information display system according to the present invention is a content information display system wherein content list information is created based on information of contents stored in a content delivery server and transmitted to a user terminal, and the user terminal presents the content list information to a user, which includes:

a server device including a cache for delivering a content to the user terminal and content storage state management means for successively managing a content storage state in the cache, and a content information display device including content list display means for creating the content list information by adding the content storage state in the cache for delivering a content to the user terminal to the information used for creation of the content list information.

A content information display method according to the present invention is a content information display method used for a system wherein content list information is created based on information of contents stored in a content delivery server and transmitted to a user terminal, and the user terminal presents the content list information to a user, which includes:

executing, by a content information display device, a content list display process of creating the content list information by adding a content storage state in a cache for delivering a content to the user terminal to the information used for creation of the content list information.

A program according to the present invention is a program to be executed by a computer incorporated into a content information display device used in a system wherein content list information is created based on information of contents stored in a content delivery server and transmitted to a user terminal, and the user terminal presents the content list information to a user, and the program includes a content list display process of creating the content list information by adding a content storage state in a cache for delivering a content to the user terminal to the information used for creation of the content list information.

Advantageous Effects

According to the present invention, by the above configuration and operation, it is possible to increase the cache hit ratio, reduce the effect of congestion such as a decrease in throughput, and thereby improve the user's quality of experience.

Explanation of Reference
1 CONTENT LIST DISPLAY DEVICE
2 EDGE SERVER
3 CENTRAL DELIVERY SERVER
4 USER TERMINAL
11 CONTENT LIST DISPLAY UNIT
21 CONTENT TRANSMITTING/RECEIVING UNIT
22 CONTENT STORAGE UNIT
23 CONTENT STORAGE STATE MANAGEMENT UNIT
24 CACHE ALLOCATION UNIT
31 CONTENT TRANSMITTING/RECEIVING UNIT
32 CONTENT STORAGE UNIT
33 CONTENT DISPLAY INFORMATION GENERATION UNIT
41 DATA DISPLAY UNIT
42 CONTENT REQUEST UNIT
100 NETWORK

BEST MODE FOR CARRYING OUT THE INVENTION

Figure 1:
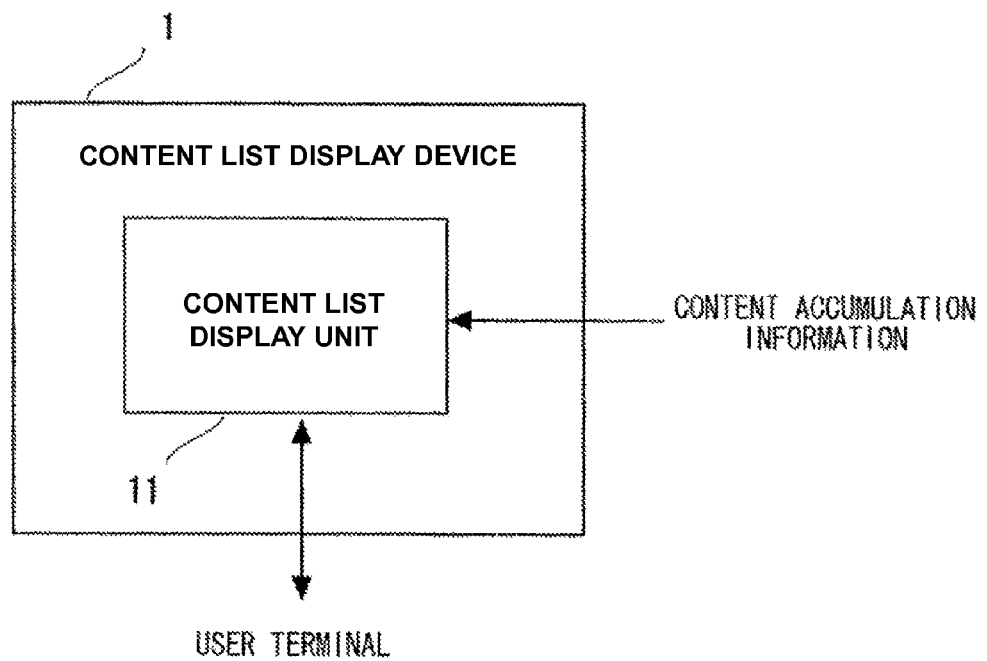
FIG. 1 is a block diagram showing an exemplary configuration of a content list display device according to the present invention.

An embodiment of the present invention is described hereinafter with reference to the drawings. An overview of the present invention is described first with reference to FIG. 1. FIG. 1 is a block diagram showing an exemplary configuration of a content list display device according to the present invention. In FIG. 1, a content list display device 1 includes a content list display unit 11.

The content list display unit 11 creates a content list (content list information) based on the storage state of a content cache that caches contents and, in response to a request from a user terminal or at regular time intervals, presents the content list to the user terminal.

In this manner, according to the present invention, the content list display device 1 creates a content list in consideration of the storage state of contents cached in an edger server in addition to information such as the number of content requests to each content and presents the content list to a user terminal.

Therefore, according to the present invention, it is possible to preferentially present the contents stored in the edge server to a user terminal and guide a request, thereby increasing the cache hit ratio in the edger server. Thus, according to the present invention, traffic based on user requests is localized between a user terminal and the edge server in close proximity to the user terminal, thereby reducing the effect of congestion such as a decrease in throughput and improving the user's quality of experience.

According to the present invention, in a delivery system that delivers a content to a user through a cache such as a proxy server or an edge server, a content list is presented on the basis of the storage state of contents cached in the proxy server or the edge server in order to increase the cache hit ratio. It is thereby possible in the present invention to increase the cache hit ratio, reduce the effect of congestion such as a decrease in throughput, and thereby improve the user's quality of experience.

Figure 2:
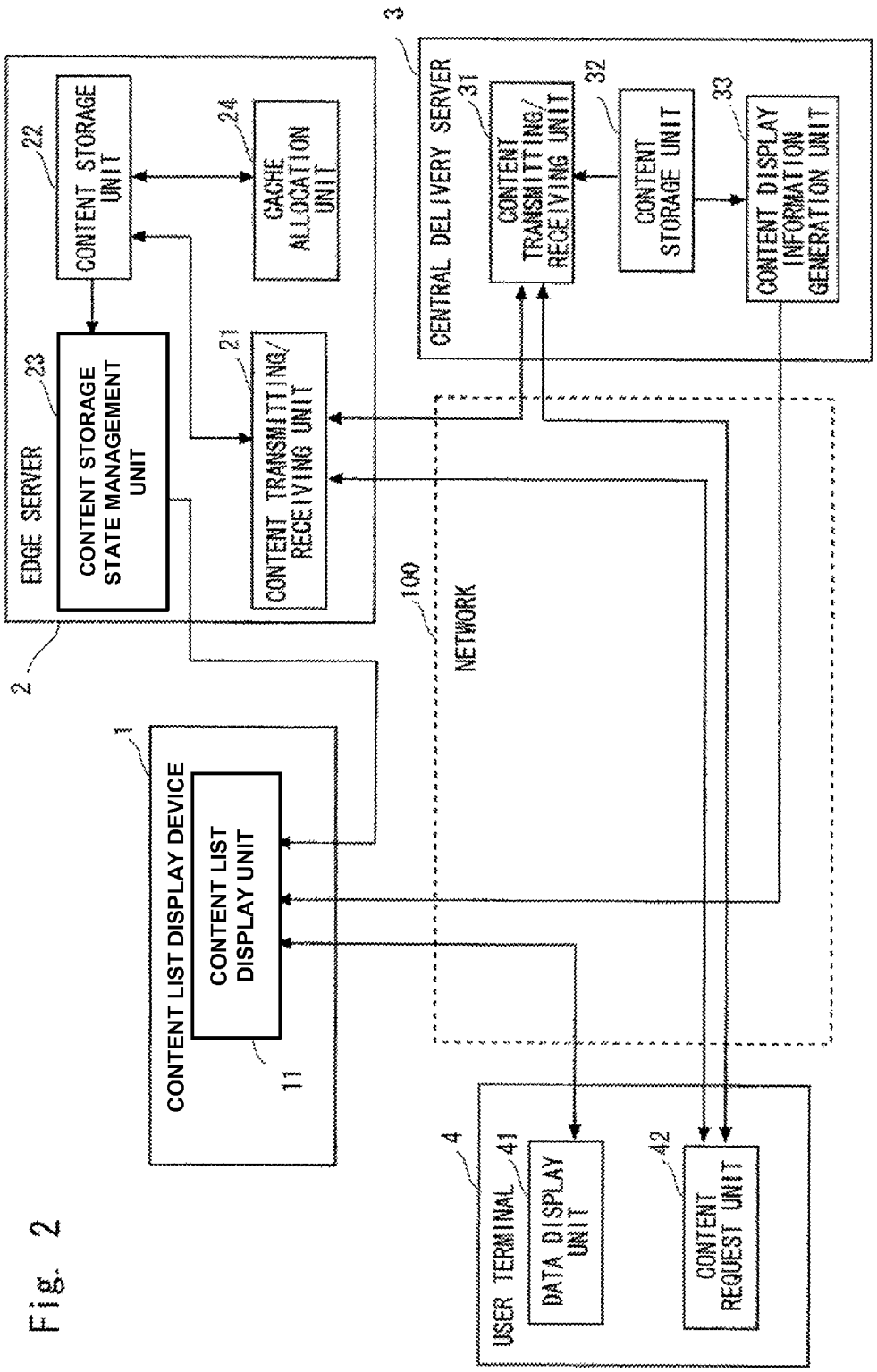
FIG. 2 is a block diagram showing a configuration of a content information display system according to a first embodiment of the present invention.

FIG. 2 is a block diagram showing a configuration of a content information display system according to a first embodiment of the present invention. In FIG. 2, the content information display system according to the first embodiment of the present invention is made up of a content list display device 1, one or a plurality of edge servers 2, a central delivery server 3 and one or a plurality of user terminals 4, which are connected over a network 100.

The content list display device 1 creates a content list and presents it to the user terminal 4. One or a plurality of edge servers 2 perform transmission and reception of a content and replication to a cache area, and management of the storage state of contents in the cache area.

The central delivery server 3 holds all contents, and performs transmission of a content in response to a request from the edge server 2 or the user terminal 4 and pre-delivery of a content according to a prescribed content delivery schedule. Further, the central delivery server 3 creates and transmits information to be used for display of a content list (which is referred to hereinafter as content display information) such as a thumbnail, a title, a genre and a playback time for the content list display device 1.

One or a plurality of user terminals 4 display a content and a content list to a user. Further, the user terminal 4 makes a request for a content to the edge server 2 or the central delivery server 3 in response to a user's operation.

The content list display device 1 includes the content list display unit 11 that creates a content list to be presented to the user terminal 4 based on the content storage state acquired from the edge server 2 by using the content display information acquired from the central delivery server 3 and transmits the content list to the user terminal 4.

Note that the processing of the content list display unit II may be implemented by executing a program in a computer (e.g. a CPU (Central Processing Device) (not shown) as a main component of the content list display device 1).

The edge server 2 includes a content transmitting/receiving unit 21, a content storage unit 22, a content storage state management unit 23, and a cache allocation unit 24. Note that the processing of the content storage state management unit 23 and the cache allocation unit 24 may be implemented by executing a program in a computer (e.g. a CPU (not shown) as a main component of the edge server 2).

The content transmitting/receiving unit 21 transmits and receives a content and makes a request for a content to the central delivery server 3. The content storage unit 22 stores a content received from the central delivery server 3 as a cache.

The content storage state management unit 23 successively monitors the contents stored in the content storage unit 22 and manages them as a content storage state. The cache allocation unit 24 performs addition, deletion, replacement, or the like of a cache in the content storage unit 22.

The central delivery server 3 includes a content transmitting/receiving unit 31, a content storage unit 32, and a content display information generation unit 33. Note that the processing of the content display information generation unit 33 may be implemented by executing a program in a computer (e.g. a CPU (not shown) as a main component of the central delivery server 3).

The content transmitting/receiving unit 31 transmits a content in response to a request from the edge server 2 or the user terminal 4. The content storage unit 32 stores all contents. The content display information generation unit 33 generates content display information for all the contents stored in the content storage unit 32 and transmits the content display information to the content list display device 1.

The user terminal 4 includes a data display unit 41 and a content request unit 42. Note that the processing of the data display unit 41 and the content request unit 42 may be implemented by executing a program in a computer (e.g. a CPU (not shown) as a main component of the user terminal 4).

The data display unit 41 displays a content and a content list for a user and accepts an operation such as a content request from a user. The content request unit 42 makes a request for a content to the edge server 2 or the central delivery server 3 when a user performs an operation of a content request on the data display unit 41.

The content list display unit 11 acquires content display information from the content display information generation unit 33 of the central delivery server 3 each time a new content is stored into the content storage unit 32 of the central delivery server 3 or at regular time intervals. The content display information referred to herein is not limited to a thumbnail, a title, a genre and a playback time but may include other information such as a user's evaluation or the number of accesses.

Then, the content list display unit 11 acquires a content storage state from the content storage state management unit 23 of the edge server 2 each time a request for a content list is made from the data display unit 41 of the user terminal 4 or at regular time intervals, creates a content list based on the acquired content display information and content storage state, and transmits the content list to the data display unit 41.

A creation method of a content list, for example, organizes the content display information in tabular form with respect to each content and, for contents corresponding to a genre, a search result or the like requested by a user through the data display unit 41, creates a list so as to display the contents stored in the content storage unit 22 sequentially in descending order of the number of content requests received by the edge server 2.

Next, the creation method of a content list displays the contents not stored in the content storage unit 22 sequentially in descending order of the number of content requests received by the edge server 2 in the same manner as above. Note that the creation method of a content list is not limited to the above-described creation method, and another creation method such as a creation method that randomly displays contents without using the number of content requests received by the edge server 2.

The content transmitting/receiving unit 21 checks contents stored in the content storage unit 22 upon receiving a content request from the content request unit 42 of the user terminal 4. When the requested content is stored in the content storage unit 22, the content transmitting/receiving unit 21 reads the requested content from the content storage unit 22 and transmits it to the content request unit 42.

On the other hand, when the requested content is not stored in the content storage unit 22, the content transmitting/receiving unit 21 makes a request for the requested content to the content transmitting/receiving unit 31 of the central delivery server 3, and transmits the requested content received from the content transmitting/receiving unit 31 to the content request unit 42. After that, the content transmitting/receiving unit 21 stores the requested content to the content storage unit 22 according to a cache replication policy.

The cache replication policy referred to herein is a policy to store the requested content when the requested content does not exist in the content storage unit 22, for example. Note that, it is not limited to that cache replication policy, and it may be another cache replication policy such as a policy to determine whether to store the requested content at a certain probability when the requested content does not exist in the content storage unit 22.

Further, when pre-delivery of a content (which is also called pre-cache, scheduled allocation or the like) is set by an operator of the content delivery system or the like, a content is acquired from the content transmitting/receiving unit 31 of the central delivery server 3 according to a prescribed content delivery schedule, and the acquired content is stored into the content storage unit 22 according to the cache replication policy in the same manner as above.

The content storage state management unit 23 manages information which contents are stored in the content storage unit 22 as a content storage state. The content storage state management unit 23 updates the content storage state each time addition, deletion or replacement of a content is performed in the content storage unit 22 or at regular time intervals.

The cache allocation unit 24 selects and deletes a content from the content storage unit 22 when the content storage unit 22 overflows as a result of storing a content into the content storage unit 22. A selection method of a content to be deleted may be a method that selects a content with the smallest number of content requests received by the edge server 2, for example. Note that it is not limited to the above selection method, and another selection method may be used such as a method of selecting a content with the longest elapsed time from the last content request to each content, a method of selecting a content with the longest elapsed time from storage into the content storage unit 22, or a method of selecting a content on a random basis.

The content transmitting/receiving unit 31 reads the requested content from the content storage unit 32 and transmits it to the content transmitting/receiving unit 21 upon receiving a content request from the content transmitting/receiving unit 21 of the edge server 2 or at regular time intervals. Further, the content transmitting/receiving unit 31 reads the requested content from the content storage unit 32 and transmits it to the content request unit 42 upon receiving a content request from the content request unit 42 of the user terminal 4.

The content display information generation unit 33 generates content display information for some or all of the contents stored in the content storage unit 32 and transmits the content display information to the content list display unit 11 of the content list display device 1 each time a new content is stored into the content storage unit 32 or at regular time intervals.

The data display unit 41 acquires a content list from the content list display unit 11 of the content list display device 1 each time a user makes a request for a content list or at regular time intervals. Then, when a request for a content list is made from a user, the data display unit 41 displays the acquired content list or the previously acquired content list for the user.

Further, when a user selects a content to view from the content list, the data display unit 41 transmits a request for the content to the content request unit 42, receives the content from the content request unit 42, and displays the content for the user.

When the content request unit 42 receives a content request from the data display unit 41, it transmits the content request to the content transmitting/receiving unit 21 of the edge server 2. Then, receiving a content from the content transmitting/receiving unit 21, the content request unit 42 transmits the content to the data display unit 41.

Further, depending on an operating method of the content delivery system, the content request unit 42 may transmit a content request to the content transmitting/receiving unit 31 of the central delivery server 3 upon redirection from the content transmitting/receiving unit 21, receive a content from the content transmitting/receiving unit 31, and transmit the content to the data display unit 41. Note that, in the following description, the description of an operating method that acquires a content from the content transmitting/receiving unit 31 is omitted, and an only operating method that acquires a content from the content transmitting/receiving unit 21 is described.

Figure 3:
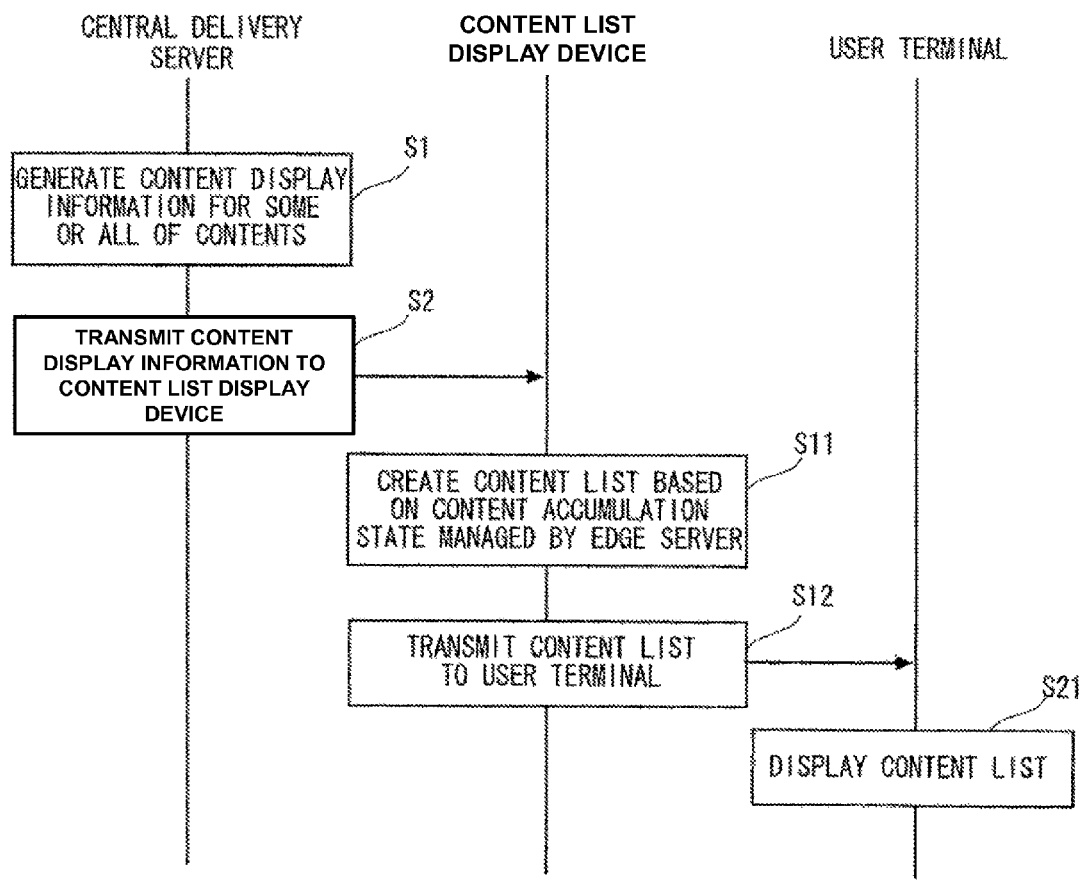
FIG. 3 is a sequence chart showing an operation of content list creation according to the first embodiment of the present invention.
Figure 4:
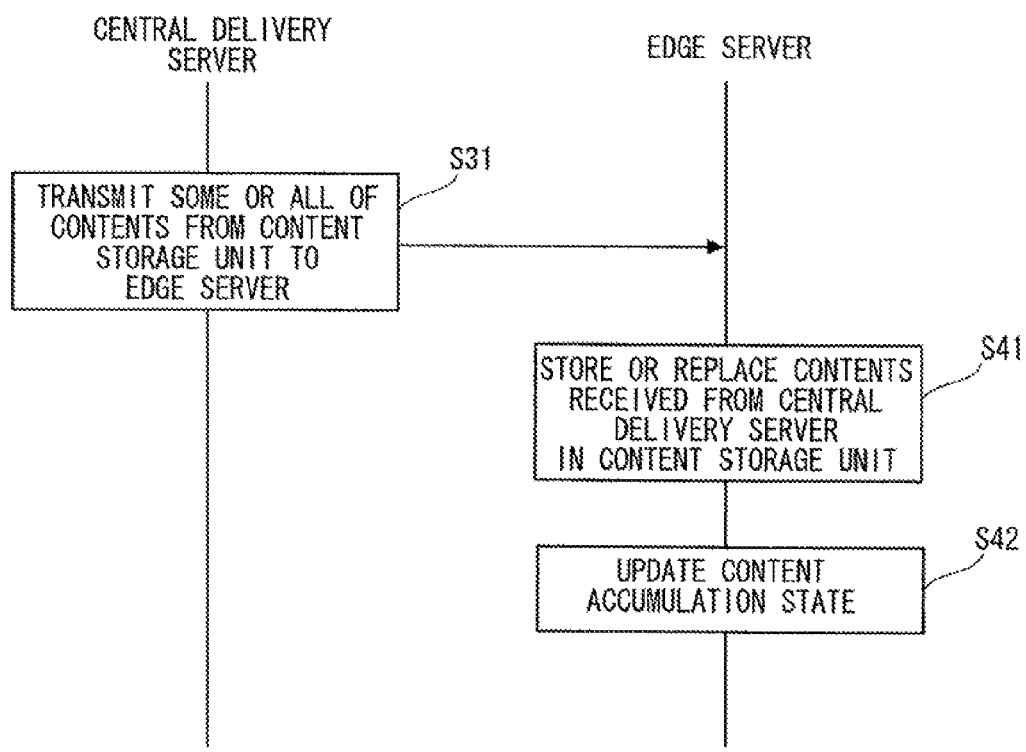
FIG. 4 is a sequence chart showing an operation of pre-delivery of a content according to the first embodiment of the present invention.
Figure 5:
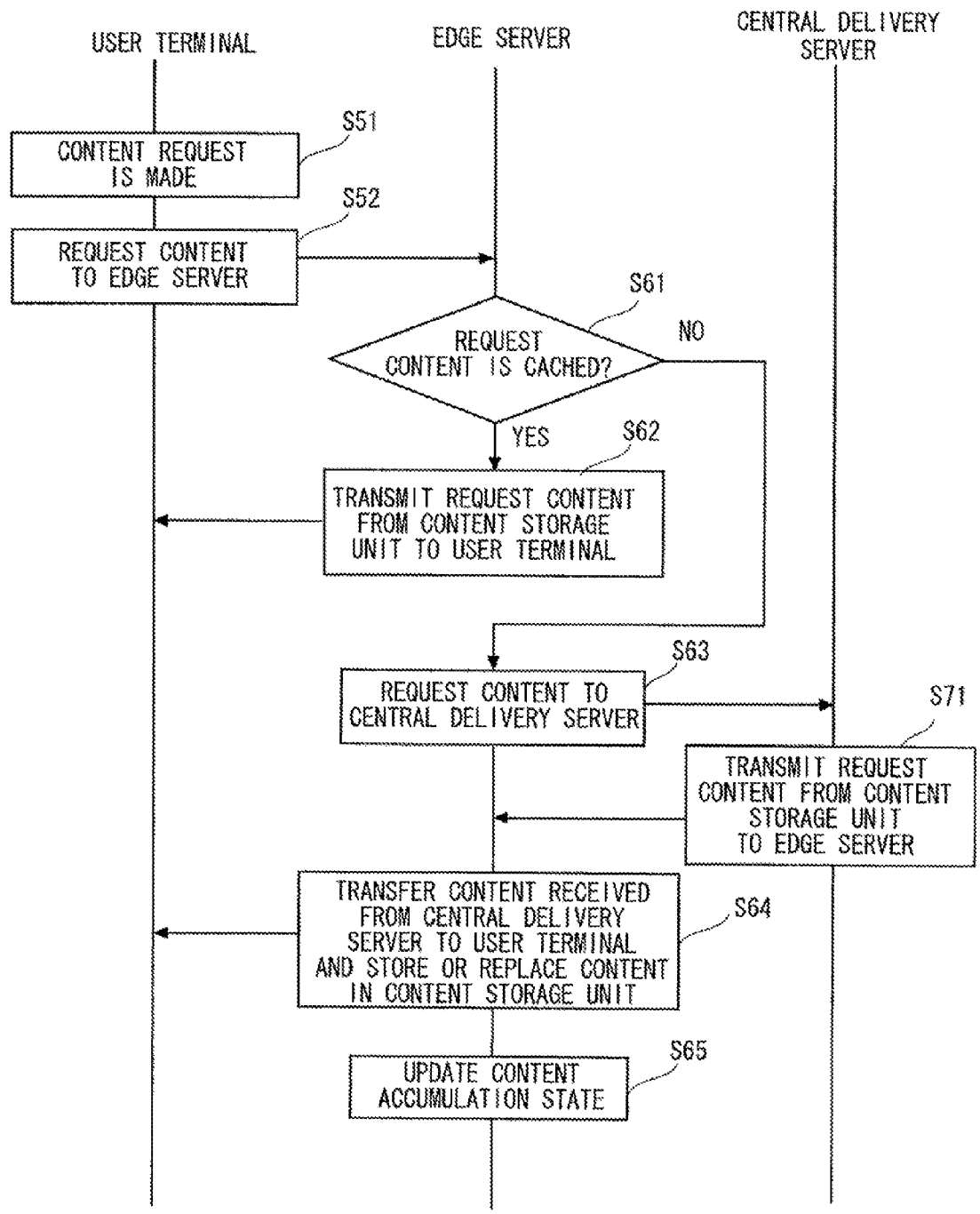
FIG. 5 is a sequence chart showing an operation of content delivery according to the first embodiment of the present invention.

FIG. 3 is a sequence chart showing an operation of content list creation according to the first embodiment of the present invention, FIG. 4 is a sequence chart showing an operation of pre-delivery of a content according to the first embodiment of the present invention, and FIG. 5 is a sequence chart showing an operation of content delivery according to the first embodiment of the present invention.

An operation according to the first embodiment of the present invention is described hereinafter with reference to FIGS. 2 to 5. The processing shown in FIGS. 3 to 5 may be implemented by executing programs in computers (e.g. CPU of each of the content list display device 1, the edge server 2, the central delivery server 3 and the user terminal 4).

First, creation and display of a content list are described.

The content display information generation unit 33 generates content display information for some or all of the contents stored in the content storage unit 32 each time a new content is stored into the content storage unit 32 or at regular time intervals (Step S1 in FIG. 3). Then, the content display information generation unit 33 transmits the content display information to the content list display unit 11 (Step S2 in FIG. 3), and the content list display unit 11 accumulates the content display information.

The content list display unit 11 acquires a content storage state from the content storage state management unit 23 each time the content storage state managed by the content storage state management unit 23 is updated, each time a request for a content list is made from the data display unit 41, or at regular time intervals, and creates a content list based on the acquired content storage state and the content display information received from the content display information generation unit 33 (Step S11 in FIG. 3).

Then, the content list display unit 11 transmits the content list to the data display unit 41 each time a request for a content list is made from the data display unit 41 or at regular time intervals (Step S12 in FIG. 3).

When a request for a content list is made by a user, the data display unit 41 displays the content list received from the content list display unit 11 for the user (Step S21 in FIG. 3).

Next, pre-delivery of a content is described.

When pre-delivery of a content is set, the content transmitting/receiving unit 31 reads a prescribed content from the content storage unit 32 and transmits the content to the content transmitting/receiving unit 21 according to a prescribed content delivery schedule (S31 in FIG. 4).

The content transmitting/receiving unit 21 stores the content received from the content transmitting/receiving unit 31 according to the cache replication policy into the content storage unit 22. The cache allocation unit 24 checks whether the capacity of the content storage unit 22 overflows as a result of storing the content, and when overflow occurs, selects a content to be deleted from the content storage unit 22 and deletes it (S41 in FIG. 4).

The content storage state management unit 23 looks over the contents stored in the content storage unit 22 and updates the content storage state each time addition, deletion or replacement of a content in the content storage unit 22 is performed or at regular time intervals (S42 in FIG. 4).

Finally, delivery of a content requested from a user is described.

When a user selects a desired content to view from the content list displayed on the user terminal 4, the data display unit 41 transmits a request for the content to the content request unit 42. The content request unit 42 transmits the content request to the content transmitting/receiving unit 21 (Steps S51, S52 in FIG. 5)

Receiving the content request from the content request unit 42, the content transmitting/receiving unit 21 checks the contents stored in the content storage unit 22 (Step S61 in FIG. 5).

When the requested content (hereinafter, request content) is stored in the content storage unit 22, the content transmitting/receiving unit 21 reads the request content from the content storage unit 22 and transmits it to the content request unit 42. The content request unit 42 transmits the received request content to the data display unit 41, and the data display unit 41 displays the received request content for the user (S62 in FIG. 5).

When the request content is not stored in the content storage unit 22, the content transmitting/receiving unit 21 makes a request for the request content to the content transmitting/receiving unit 31 (S63 in FIG. 5).

Receiving the content request from the content transmitting/receiving unit 21, the content transmitting/receiving unit 31 reads the request content from the content storage unit 32 and transmits it to the content transmitting/receiving unit 21 (Step S71 in FIG. 5).

Receiving the request content from the content transmitting/receiving unit 31, the content transmitting/receiving unit 21 transfers the request content to the content request unit 42. After that, the content transmitting/receiving unit 21 stores the request content into the content storage unit 22 according to the cache replication policy. The subsequent behavior of the cache allocation unit 24 is the same as the processing of Step S41 (Step S64 in FIG. 5). Further, the content request unit 42 transmits the received request content to the data display unit 41, and the data display unit 41 displays the received request content for the user.

The content storage state management unit 23 looks over the contents stored in the content storage unit 22 and updates the content storage state each time addition, deletion or replacement of a content in the content storage unit 22 is performed or at regular time intervals (S65 in FIG. 5).

After that, according to a content request from a user or a prescribed content delivery schedule or the like, the processes of the above-described Steps S1, S2, S11, S12, S21, S31, S41, S42, S51, S52, S61 to S65 and S71 are performed repeatedly.

As described above, according to this embodiment, the content list display unit 11 creates a content list in consideration of the content storage state in the edge server 2 in addition to information such as the number of content requests to each content and the content display information, and presents the content list to the user terminal 4.

Therefore, according to this embodiment, it is possible to preferentially present the contents stored in the edge server 2 to a user and guide a request, thereby increasing the cache hit ratio in the edge server 2. Thus, according to this embodiment, traffic based on user requests is localized between the user terminal 4 and the edge server 2 in close proximity to the user terminal 4, thereby reducing the effect of congestion such as a decrease in throughput and improving the user's quality of experience.

This application it the National Phase of PCT/JP2009/052808, filed Feb. 18, 2009, which is based upon and claims the benefit of priority from Japanese patent application No. 2008-061950 filed on Mar. 12, 2008, the disclosure of which is incorporated herein in its entirety by reference.

Industrial Applicability

The present invention may be used for applications such as a display device of a content list such as EPG (Electronic Program Guide), ECG (Electronic Content Guide) or a portal site screen and a device that presents a search result in response to a search query from a user.

The invention claimed is:

1. A content information display device used in a system wherein a content list is created based on information of contents stored in an edge server and transmitted to a user terminal, and the user terminal presents the content list to a user, said content information display device comprising:
    a content list display unit that creates the content list to preferentially present the content stored in a cache to the user terminal based on the user's preference, by adding a content storage state to the information used for creation of the content list information for delivering the content to the user terminal, the content storage state indicates if the content is present in the cache of the edge server, and to guide a request to increase the cache hit ratio in the edge server,
    wherein the content list display unit creates the content list so as to display contents accumulated in the cache of the edge server sequentially in descending order of the number of content requests received by the edge server and then display contents not accumulated in the cache of the edge server sequentially in descending order of the number of content requests received by the edge server.

2. The content information display device according to claim 1, wherein the content list display unit creates the content list based on meta-information of contents extracted from some or all of the contents and displayed in the content list and the content storage state of the contents.

3. A content information display system wherein a content list is created based on information of contents stored in an edge server and transmitted to a user terminal, and the user terminal presents the content list to a user, said content information display system comprising:
    a server device including a cache for delivering a content to the user terminal and a content storage state management unit that successively manages a content storage state; and
    a content information display device including a content list display unit that creates the content list to preferentially present the content stored in the cache to the user terminal based on the user's preference, by adding the content storage state to the information used for creation of the content list information for delivering the content to the user terminal, the content storage state indicates if the content is present in the cache of the edge server, and to guide a request to increase the cache hit ratio in the edge server,
    wherein the content list display unit creates the content list so as to display contents accumulated in the cache of the edge server sequentially in descending order of the number of content requests received by the edge server and then display contents not accumulated in the cache of the edge server sequentially in descending order of the number of content requests received by the edge server.

4. The content information display system according to claim 3, wherein
    the edge server includes a content display information generation unit that extracts meta-information of contents to be displayed in the content list for some or all of the contents and provides the meta-information to the content list display unit, and
    the content list display unit creates the content list based on the meta-information of the contents and the content storage state of the contents.

5. A content information display method used for a system wherein a content list is created based on information of contents stored in an edge server and transmitted to a user terminal, and the user terminal presents the content list to a user, said content information display method comprising:

executing, by a content information display device, a content list display process of creating the content list to preferentially present the content stored in a cache to the user terminal based on the user's preference, by adding a content storage state to the information used for creation of the content list information for delivering the content to the user terminal, the content storage state indicates if the content is present in the cache of the edge server, and to guide a request to increase the cache hit ratio in the edge server, wherein the content list display process creates the content list so as to display contents accumulated in the cache of the edge server sequentially in descending order of the number of content requests received by the edge server and then display contents not accumulated in the cache of the edge server sequentially in descending order of the number of content requests received by the edge server.

6. The content information display method according to claim 1, wherein the content list display process creates the content list based on meta-information of contents extracted from some or all of the contents and displayed in the content list and the content storage state of the contents.

7. A non-transitory storage medium storing a program to be executed by a computer incorporated into a content information display device used in a system wherein content list is created based on information of contents stored in an edge server and transmitted to a user terminal, and the user terminal presents the content list to a user, wherein the program causes the computer to execute a content list display process of creating the content list information to preferentially present the content stored in a cache to the user terminal based on the user's preference, by adding a content storage state to the information used for creation of the content list information for delivering the content to the user terminal, the content storage state indicates if the content is present in the cache of the edge server to the information used for creation of the content list for delivering the content to the user terminal, and to guide a request to increase the cache hit ratio in the edge server, wherein the content list is created so as to display contents accumulated in the cache of the edge server sequentially in descending order of the number of content requests received by the edge server and then display contents not accumulated in the cache of the edge server sequentially in descending order of the number of contents requests received by the edge server.

* * * * *